TWO TERMINAL TRIGGERING CIRCUIT COMPRISING COMPLEMENTARY
TRANSISTORS WITH ONE TRANSISTOR HAVING
EMITTER OPERATING AS COLLECTOR
Filed July 31, 1963

PNP-NPN TRANSISTOR CIRCUIT

DWIGHT C. LEWIS INVENTOR.

BY K. M. LEFEVER
ATTORNEY

United States Patent Office 3,238,384

Patented Mar. 1, 1966

3,238,384

TWO TERMINAL TRIGGERING CIRCUIT COMPRISING COMPLEMENTARY TRANSISTORS WITH ONE TRANSISTOR HAVING EMITTER OPERATING AS COLLECTOR

Dwight C. Lewis, 5401 Bristol St., Elkhart, Ind.

Filed July 31, 1963, Ser. No. 298,835

5 Claims. (Cl. 307—88.5)

This invention relates to a new and improved electronic circuit. Particularly the invention relates to an electronic circuit having avalanching or regenerative characteristics. More particularly the invention relates to a new and improved avalanching or "triggering" circuit which utilizes means for storing electrical potential coupled with means for a sudden release of that potential upon the occurrence of a pre-specified event.

Triggering circuits are well known in the prior art. Uses of such circuits are many and varied and the theory of their operation is diverse. One type of a triggering device is based on the concept of an electrical charge being stored in storing means until a certain potential is reached and the complete release of the charge upon the happening of the particular event, normally the obtention of a given potential. It is to this concept that the device of the instant invention is directed.

The prior art triggering or avalanching devices, which may be illustrated, for example by the "Shockley diode," have been found to operate very well in the circuits for which they are designed. However, they are limited in application due to their expense and lack of flexibility in that they normally have but one discharge point.

The instant invention is directed toward a novel electrical circuit having triggering or avalanching characteristics which eliminate the above enumerated disadvantages of the prior art devices. The circuit of the invention utilizes low cost elements and incorporates a variable feature which enables the circuit design to be applied to a greatly extended variety of uses since the discharge or avalanche point may be regulated within limits imposed only by the elements of the circuit.

Briefly stated, the improved circuit of the instant invention comprises two transistors and a resistor.

The first transistor in the circuit, a P-N-P transistor, has its electrical connections reversed in that the collector is wired to function as the emitter and its emitter is arranged to function as the collector in the circuit. The second transistor, which is in series with the first, is an N-P-N transistor, whose base-emitter circuit is shunted by a variable resistor. It will be understood, of course, that the transistors may be reversed, that is the first may be an N-P-N transistor and the second a P-N-P transistor, in which event all supply polarities will be reversed.

The gist of the instant inventive circuit is the modified arrangement of the series transistors and the resulting variability thereof. It is known in the art that the collector current of a transistor is equal to the leakage current of the device times the current gain. Thus when two transistors are connected as shown in the circuit of FIG. 1, the current around the circuit is equal to the leakage current times the current gain of the first transistor plus this product times the current gain of the second transistor plus this product times the current gain of the first transistor, etc. This expression may be expressed by the following equation:

(Equation 1)

$$I=I_{ceo}+\beta_1 I_{ceo}+\beta_1\beta_2 I_{ceo}+\beta_1^2\beta_2 I_{ceo}+\beta_1^2\beta_2^2 I_{ceo}+\ \ldots$$
$$=I_{ceo}(1+\beta_1+\beta_1\beta_2+\beta_1^2\beta_2+\beta_1^2\beta_2^2+\beta_1^3\beta_2^2+\beta_1^3\beta_2^3+\ \ldots$$
$$=I_{ceo}[(1+\beta_1\beta_2+\beta_1^2\beta_2^2+\beta_1^3\beta_2^3+\ \ldots)+(\beta_1+\beta_1^2\beta_2+\beta_1^3\beta_2^2+\ \ldots)]$$
$$=I_{ceo}[(1+\beta_1\beta_2+\beta_1^2\beta_2^2+\beta_1^3\beta_2^3+\ \ldots)+\beta_1(1+\beta_1\beta_2+\beta_1^2\beta_2^2+\ \ldots)]$$
$$=I_{ceo}(1+\beta_1\beta_2+\beta_1^2\beta_2^2+\beta_1^3\beta_2^3+\ \ldots\ +\beta_1^n\beta_2^n)(1+\beta_1)$$

wherein:

$I$=current $I_{ceo}$=leakage current equals $\frac{I_{CBO}}{1-\alpha_2}$ $\beta_1$=current gain of first transistor $\beta_2$=current gain of second transistor It is to be seen that this is an expression for a geometric progression where $n$ approaches infinity and may be expressed by the equation:

(Equation 2)

$$I=I_{ceo}\left(\frac{1}{1-\beta_1\beta_2}\right)(1+\beta_1)$$

Since $\beta_1$, or the current gain of the first transistor equals $$\frac{\alpha_1}{1-\alpha_1}$$

where $$\alpha_1=\frac{\text{collector current}}{\text{emitter current}}$$

and since $\beta_2$, or the current gain of the second transistor equals $$\frac{\alpha_2}{1-\alpha_2}$$

Substitution of these values in Equation 2 gives the expression:

(Equation 3)

$$I=\frac{I_{CBO}}{1-(\alpha_1+\alpha_2)}$$

From the above expressions it will be seen that the device will trigger, that is it will avalanche or become regenerative when the sum of $\alpha_1$ and $\alpha_2$ is equal to 1. Then the current through the device will be limited only by its external load.

The current gain of a transistor never exceeds unity and is a function of the collector to emitter voltage. It is desirable that the first transistor have a low order of current gain, that is in the order of 0.4 to 0.6. This may conveniently be attained with ordinary transistors by inversion, that is to say by inverting the collector and emitter. The second transistor has a resistor shunted across the base to emitter. This permits the establishing of a definite value for the current gain of this transistor-resistor combination which is between 0 and its maximum current gain. Therefore, the quantity in the equation above may be varied at will by arbitrarily establishing the value of this shunt resistance.

Figure 1:
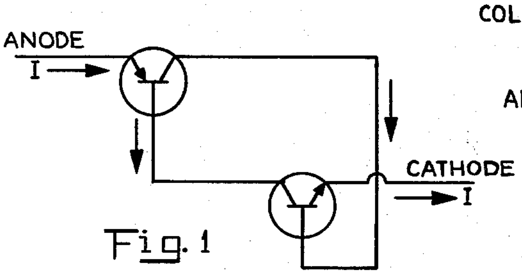
FIG. 1 illustrates a two terminal PNP–NPN transistor series circuit.
Figure 2:
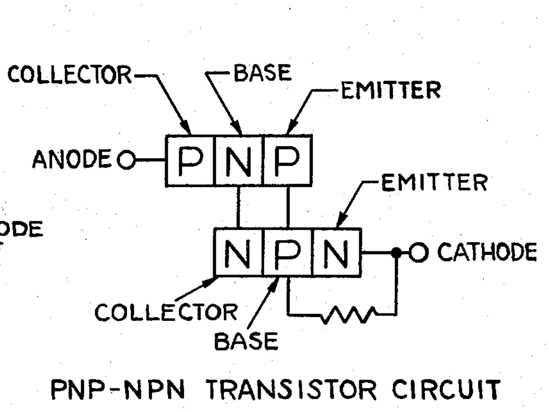
FIG. 2 is a schematic diagram of the transistor circuit embodying the invention.
Figure 3:
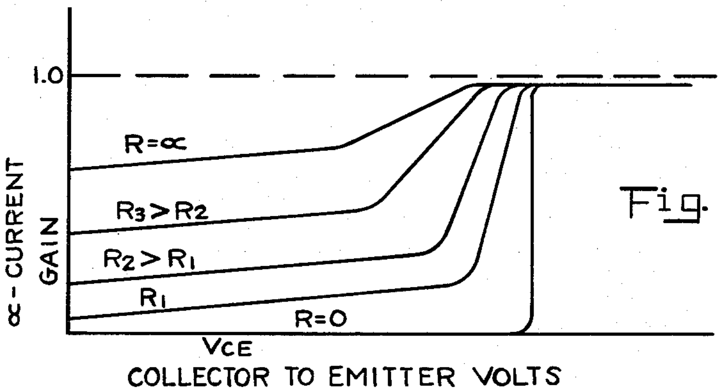
FIG. 3 shows a typical characteristic of the apparent current gain for a resistor-transistor combination with different values of base to emitter shunt resistance.
Figure 4:
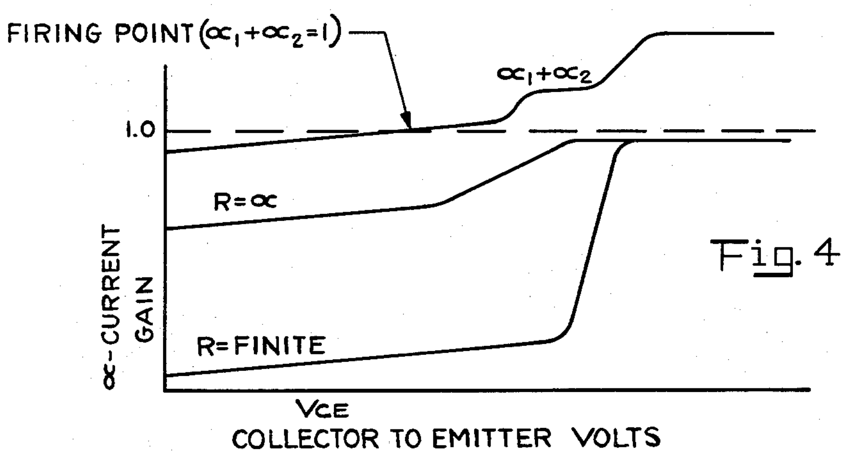
FIG. 4 shows the sum of the current gains when R equals infinity and when R has a finite value. The triggering, or avalanche point of the device, is indicated as the value of the voltage from the collector to emitter where $(\alpha_1+\alpha_2)$ is unity.

The improved triggering circuit of this invention has a number of uses which will be apparent to those skilled in the art. For example, this circuit may be used to trigger a Silicon Controlled Rectifier which is the well known three terminal device consisting of a cathode, anode and a gate. The device is switched on by the trigger current applied through the gate and cathode with a positive to negative voltage applied anode to cathode. The improved circuit of this invention is extremely useful in triggering this well known electronic tool.

The improved circuit of the invention may also be used to activate a latching relay, as a saw-tooth generator, as a circuit protector to prevent over voltage, etc. The flexibility of the device by reason of the variable shunt resistance makes it applicable in a number of circuits which were hitherto not available.

To summarize briefly, the instant invention relates to a novel and unique electronic circuit which functions as a triggering or avalanching device and comprises a pair of transistors connected in series wherein the first transistor is inverted so that the collector operates as an emitter and vice versa and wherein the base to emitter circuit of the second transistor is shunted by a variable resistor. Thus the avalanching or triggering potential of the device may be varied by changing the resistance of the shunt. The transistors may be a P-N-P transistor in series with an N-P-N transistor or vice versa.

What is claimed is:

1. An avalanche triggering circuit for selectively supplying current to a load comprising:

first and second transistors of opposite conductivity respectively, each having an emitter, base and collector electrode, first circuit means coupling the emitter electrode of said first transistor to the base electrode of said second transistor, second circuit means coupling the base electrode of said first transistor to the collector electrode of said second transistor, shunting means interconnecting the base and emitter electrodes of said second transistor for varying the current gain of said second transistor, input means for connecting a source of forward biasing potential to the collector electrode of said first transistor, and output means for coupling the emitter electrode of said second transistor to said load whereby when the sum of the current gain of said first and second transisors approaches unity the current supplied to said load is determined primarily by the impedance of said load.

2. The circuit of claim 1 wherein said shunting means comprises a variable resistor.

3. A variable current gain triggering circuit for selectively delivering current to a load comprising first and second transistors of opposite conductivity respectively each having an emitter, base and collector electrode, means interconnecting said first and second transistors in a series circuit whereby the base electrode of said first transistor is directly connected to the collector electrode of said second transistor and the emitter electrode of said first transistor is directly connected to the base electrode of said second transistor, variable resistive means interconnecting the base and emitter electrodes of said second transistor for varying the current gain of said second transistor, input means for coupling a source of forward biasing potential to the collector electrode of said reverse conducting first transistor, and output means for coupling the emitter electrode of said second transistor to said load whereby leakage current through said first transistor is applied as base current for said second transistor or through said variable resistor to said load, depending upon the value of said variable resistive means.

4. An electrical circuit component having avalanching characteristics and being a two-terminal device provided with an anode terminal and a cathode terminal for interconnection of said component to electrical circuitry for operation, said component comprising, two transistors of opposite conductivity, each having at least emitter, collector, and base electrodes, said transistors being electrically interconnected one with the other with the emitter of a first one of said transistors connected to the base of said second transistor, the base of said first transistor connected to the collector of said second transistor, and the collector of said first transistor connected to one of said terminals of said component, while the emitter of said second transistor is connected to the other of said terminals of said component, and a resistor interconnecting the base and emitter of said second transistor, said resistor being selected of an ohmic value to cause avalanching of said electrical component under conditions where a voltage is applied to said component through said terminals at a polarity to cause normal conduction of said second transistor.

5. The component of claim 4 wherein the effective ohmic value of said resistor may be selectively varied to provide a controllable avalanching of said component.

References Cited by the Examiner

UNITED STATES PATENTS 3,049,642 8/1962 Quinn ------------- 307—88.5

OTHER REFERENCES

Pub.: "Design Guide for Reliable Trigistor Circuits," Applications and Circuit Design Notes, Solid State Products, Inc., May 13, 1960, page 3 relied on.

Pub.: "SCR Manual," General Electric, copyright December 29, 1961, pages 2 and 3 relied on.

ARTHUR GAUSS, *Primary Examiner.*